(12) United States Patent
VanDamme

(10) Patent No.: US 6,807,545 B1
(45) Date of Patent: Oct. 19, 2004

(54) METHOD AND SYSTEM FOR RETRIEVING DOCUMENTS VIA AN ELECTRONIC DATA FILE

(75) Inventor: Fernand Jozef VanDamme, Gent (BE)

(73) Assignee: Het Babbage Instituut voor Kennis en Informatie Technologie "B.I.K.I.T.", Gent (BE)

(*) Notice: Subject to any disclaimer, the term of this patent is extended or adjusted under 35 U.S.C. 154(b) by 0 days.

(21) Appl. No.: 09/301,371

(22) Filed: Apr. 21, 1999

(30) Foreign Application Priority Data

Apr. 22, 1998 (BE) .............................. 09800302

(51) Int. Cl.⁷ .............................. G06F 17/80
(52) U.S. Cl. .............................. 707/102; 707/2; 707/3; 707/100
(58) Field of Search .................. 707/3, 4, 7, 1–10, 707/100–104.1

(56) References Cited

FOREIGN PATENT DOCUMENTS

| WO | WO 96/32686 | 10/1996 |
|---|---|---|
| WO | WO 97/34242 | 9/1997 |

OTHER PUBLICATIONS

Khan et al., Personal Adaptive Web Agent: a Tool for Information Filtering, May 28, 1997, Electrical and Computer Engineering, 1997. Engineering innovation: Voyage of Discovery, IEEE, 1997 vol. 1, pp. 305–308.*

Ginsberg, A., A unified approach to automatic indexing and information retrieval, Oct. 1993, IEEE Expert vol. 8, Issue: 5, pp. 46–56.*

Gao et al., Fuzzy multilinkage thesaurus builder in multimedia information systems, Aug. 16, 1995, Document Analysis and Recognition, 1995. pp. 142–145 vol. 1.*

Kimito et al.; "*Associated Information Retrieval System (AIRS)—Its Performance and User Experience*"; 2334D IEICE Transactions on Information and Systems; E76–D (1993) Feb., No. 2, Tokyo, JP.

Meltzer et al.; "*Text Searching Using an Inversion Database Consisting of Trigrams*"; Second International Conference on Computers and Applications; (Cat 87 CH 2433–1) Beijing, China, Jun. 23–27, 1987 (pp. 65–69).

* cited by examiner

Primary Examiner—Jean M. Corrielus
Assistant Examiner—Joon Hwan Hwang
(74) Attorney, Agent, or Firm—Bacon & Thomas, PLLC

(57) ABSTRACT

A method for retrieving documents via an electronic data file, characterized in that keys are used for the retrieval which find one or several relations between the textual data of the documents concerned.

16 Claims, No Drawings

METHOD AND SYSTEM FOR RETRIEVING DOCUMENTS VIA AN ELECTRONIC DATA FILE

BACKGROUND OF THE INVENTION

1. Field of the Invention

The present invention concerns a method for retrieving documents via an electronic data file, as well as a system for realizing this method.

In the first place, the invention is meant to be used in data systems in which electronic documents or parts of these documents are stored so as to be able to retrieve the required documents by means of specific search keys later on. In a more general way, however, the invention can be applied in any system whatsoever which includes electronic documents.

In particular, the invention aims a method for indexing electronic documents in a special manner so as to be able to retrieve them later on by means of specific search keys.

2. Description of Related Art

Different methods for indexing and subsequently retrieving data from electronic documents are already known. Examples thereof are described among others in the patents U.S. Pat. No. 5,007,019, U.S. Pat. No. 5,371,807, U.S. Pat. No. 5,418,951, U.S. Pat. No. 5,555,408, WO 95/14973 and WO 96/23265.

In general, one could say that there are three methods for translating textual data in indexes. The first method is an automatic, 'non-intelligent' indexing method. According to this method, words are automatically retrieved from a text by means of an evaluation system and they are integrated in an index.

The second method is the manual 'intelligent' indexing method. This method usually makes use of predetermined coordinates. The person who indexes the documents assigns one or several labels to each document, on the basis of which the document can be retrieved later on.

The third method is the automatic 'intelligent' indexing method. Here, the documentation officer of the second method is replaced by an automatic system.

It is clear that the quality of the method with which the right documents can be retrieved in no time later on depends on the keys which are used for indexing. We mainly distinguish two basic keys.

A first basic key concerns the 'exhaustibility', by which is implied in how far the content of a specific document is entirely stored by means of the index. A second basic key is the specificity, which is determined in view of the precision with which searched documents can be retrieved.

It is clear that, in order to be able to retrieve the right documents in less then no time, a method is required offering an ideal balance between the possibility for retrieving the documents on the one hand, and the precision with which they can be retrieved on the other hand. In the case of exhaustive indexing, situations are created whereby, when searching for specific documents which are related to a specific subject, a large number of documents will appear, including a lot of information which is worthless, however. In this case, the retrieved documentation is said to contain a lot of 'noise'. A high precision implies that only useful information is indexed by assigning very precise labels to it.

Further, it is known that one can index by what is called 'single-term indexing', whereby indexes are assigned to single terms, i.e. words, or by what is called 'term relationship indexing', whereby indexes are assigned which allow for relationships between different concepts.

The systems for electronic document management which are known until now are disadvantageous in that they are all mainly based on statistical formulas and do not make use of indexing methods based on knowledge, or in that, when use is made of indexing methods based on knowledge, the methods used thereby are little efficient.

SUMMARY OF THE INVENTION

The present invention aims a method for managing documents, in particular for storing and/or retrieving documents which enable the end-user to obtain relevant information in a very efficient manner, by which is meant that the right documents can be retrieved with very great precision and without any considerable 'noise'.

To this aim, the invention first of all provides for a method for retrieving documents via an electronic data file, characterized in that keys are used for the retrieval which find one or several relations between the textual data of the documents concerned.

DETAILED DESCRIPTION

According to the most preferred embodiment, keys will be used which find 'causal' relations.

The use of keys which find other 'relations' is not excluded, however. An example thereof are 'functional' relations. Also different relations can be used, in other words combinations can be made.

Preferably, the above-mentioned causal relations are used for assigning indexes to the documents which are put in, such that when these documents have to be retrieved again, causal or other relations will be automatically looked for on the basis of these indexes. Although the invention is in the first place meant for indexing documents in this manner, and for making it subsequently possible to retrieve these documents on the basis of said indexes, it is not excluded to use the method of the invention only at the time of the retrieval, without using any indexes.

Finding relations, in particular causal and/or functional relations, offers the advantage that the semantic profusion of a thesaurus can be optimally used for indexing documents and/or for retrieving documents from a data file.

Preferably, in connection with the present invention, use will be made of one or several subject-oriented thesauri, in particular thesauri which are related to specific domains.

According to a preferred embodiment, apart from the above-mentioned thesaurus or thesauri, a file can also be made and/or used in which causal relations have been established. This helps end-users in finding causes and/or relations in specific contexts.

The basic concept of the above-mentioned method of the invention can be realized in different ways in practice.

In order to better explain the characteristics of the invention, the following practical as well as preferred embodiment is described.

According to this preferred embodiment, use is made of a structure in which mainly five basic components can be distinguished.

The first component consists of means managing a thesaurus. This component may also be called the 'thesaurus manager'. Said component allows in the known manner to store new data in the thesaurus, as well as equivalent terms, broader and more restricted terms.

The second component consists of means allowing for a syntactical analysis, which component can be referred to in short as the 'parser', and which basically is a linguistic analyzer. This linguistic analyzer aims to retrieve new documents and to automatically index documents on the basis of semantic relations in the specific domain of the used thesaurus.

The parser preferably automatically generates relevant catchwords and concepts for every electronic document in ASCII-format.

The third component consists of graphical search formulator means, or what is called a 'graphic query builder'. These query builders make it possible for the end-user to enter a query in the appropriate manner. Said query builders also identify the number of documents that are retrieved when a specific catchword is entered, as well as the number of concepts that are found hereby. Also the number of broad terms connected with a restricted term are represented.

The fourth component consists of means determining and recording causal relations, which component may be called the 'relation manager' within the scope of the present invention. The fourth component allows for the interactive extraction of causal or possibly other relations.

The fifth component consists of query builders which make it possible to navigate through the file between the documents which have been indexed by means of the relation manager, such on the basis of relations, in particular causal relations.

The above-mentioned relations make sure that, by means of algorithms or such, the corresponding operations or steps of the method can be carried out. A number of the possible operations will be systematically explained hereafter so as to illustrate the invention.

Preferably, full texts of documents will be taken as a basis, which are all written in the same language, preferably in English. In particular, we will work with texts which are written out in a natural way.

A first step or operation to be carried out according to the invention makes use of the above-mentioned first and second components and provides for a first indexing or processing on the basis of the thesaurus concerned, which step may be called 'thesaurus-based indexing'.

During this first step, the text is for example automatically checked for explicit index terms, by which is meant terms which are found literally in the text of the document concerned. These explicit index terms may consist of unigrams and/or bigrams and/or trigrams, whereby the unigrams stand for separate words, whereas the bigrams and trigrams consist of terms with two, three words respectively. A unigram is for example the word 'composition', whereas the term 'recrystallization behavior' is a bigram and the term 'low carbon steels' is a trigram.

In order to retrieve these explicit index terms, the text data are filtered, which filtering implies at least the elimination of expletives.

The remaining words are further filtered in order to eliminate the least relevant unigrams and/or bigrams and/or trigrams. For this extra filtering, use is preferably made of a frequency filtering, i.e., the unigrams and/or bigrams are ranked according to their frequency of occurrence. Such frequency filtering consists in that the occurrence of every unigram, bigram or trigram in the ext is checked, after which the unigrams, bigrams and trigrams occurring only to a restricted extent are eliminated. This frequency filtering can be set and altered by the user.

Next, the retained explicit index terms, i.e., those whose frequency ranking is high enough to avoid being eliminated during frequency filtering, are compared to the content of the used thesaurus and at least those terms occuring in the thesaurus are taken into consideration for further indexing.

A list is made of the explicit index terms which do not occur in the thesaurus which makes it possible to update the thesaurus. A user or a documentation officer can have a look at this list, who may then decide what words of this list should be added to the thesaurus. This allows for interactive updating.

During the query for bigrams and/or trigrams, these are preferably recorded by checking, after the expletives have been eliminated, what unigrams occur and by determining what terms are adjacent to them.

In a second operation or step, use is also made of the above-mentioned first and second components, and concepts which are based on the thesaurus are generated. Also, this step may be called the 'thesaurus-based concepts generation'.

In this step, implicit index terms, in other words concept terms, are added to the explicit index terms, in other words the terms which can be explicitly found in the text and which have been determined as mentioned above by ranking according to frequency. These implicit index terms are terms which are retrieved from the thesaurus on the basis of the fact that they are related to the explicit index terms. The relation between these two type of terms, i.e., the explicit and implicit terms, has been established in the thesaurus.

The implicit index terms may be terms which are either more restricted or broader than the explicit index terms. For example, the term 'metal' is a broader term than 'steel', and for example the term 'low carbon steel' is a more restricted term related to the term 'steel'.

It should be noted that when indexing a document, only a restricted number of index terms are preferably accorded to the latter, such by a drastic selection of the most relevant, i.e., frequent, explicit index terms and corresponding broader or narrower implicit index terms.

A third operation which may be carried out within the scope of the invention, based on the use of the above-mentioned third component, i.e. the graphic query builder, consists in retrieving documents on the basis of the thesaurus, in short called 'thesaurus-based document retrieval'. This operation makes it possible to look for terms without any causal relations being implied. This possibility may be useful in specific cases, and it offers the advantage that the use of the database is not restricted to the exclusive retrieval via 'relations'.

According to the invention, query builders are preferably provided for, in particular an algorithm, which exclusively provide access to the user via catchwords which are included in the thesaurus. As a result, one of the conventional problems of document retrieval is solved, namely in that a vocabulary mishmash between the knowledge of the user and the knowledge stored in the database is excluded.

The algorithm which is used hereby allows the user to run a query, referring to a specific term, and subsequently offers further retrieval possibilities on the basis of this term. According to the invention, use is hereby made of a hierarchical structure with broader and more restricted terms. Thus, for example, departing from the term 'steel', a first broader term might be 'ferrous alloys', whereas a subsequent broader term might be 'transition metal alloys', etc.

A fourth major operation or step within the scope of the present invention is the extraction of relations, for example causal and/or functional relations, in an automatic manner.

Use is hereby made of electronic means, in particular an algorithm, for automatically identifying and extracting causal relations between the located index terms, either explicit and/or implicit index terms.

The automatic retrieval is carried out on the basis of a list of terms containing a relation indication. This list contains words such as 'depends', 'causes', 'effects', etc.

According to the most preferred embodiment, use will be made of postulated causal and/or functional frames which are composed of catchwords on the one hand and of voice components, including the above-mentioned terms containing a relation indication, on the other hand, and the text of the documents concerned will be examined for these frames.

In particular, use will be made of frames with catchwords defining at least three arguments, an argument representing a cause, an argument representing an effect and an argument representing a situation respectively.

As an example, the frame which is related to the pattern 'effect of' may look as follows:

'F' and 'K1' and 'on' and 'K2' and 'C' and 'K3' whereby:

F is the expression 'effect of';

C represents the condition and may consist of the terms 'of', 'in', 'at' or such;

K1 are the arguments representing a cause;

K2 are the arguments representing an effect;

K3 are the arguments representing a situation.

The expressions 'effect of' and 'on' form voice components.

In a similar way, different causal and/or functional frames are determined beforehand.

By means of an automatic syntactic analysis, the relation between the above-mentioned index terms, either explicit and/or implicit, and the voice components is determined, and as a function thereof is determined what causal frames occur in a text and the indexing is finally carried out.

Each time a frame, for example a causal or a functional frame, is identified, the corresponding terms K1, K2, K3 are recorded in separate records which are designed respectively for the terms which are always situated on the location K1, K2, K3 respectively. Thus, there is a record for the arguments representing a cause, representing an effect and representing a situation or condition respectively.

When for example the following sequence of terms occurs in the text: effect of CHEMICAL COMPOSITION on RECRYSTALLIZATION BEHAVIOR in LOW CARBON STEELS, it is clear that this will be recognized as a causal frame. By putting the terms CHEMICAL COMPOSITION, RECRYSTALLIZATION BEHAVIOR and LOW CARBON STEELS in the above-mentioned records, it is clear that, conversely, the document concerned can be retrieved by searching for the appropriate causal relations.

The result of the above-mentioned syntactical analysis can be either or not first submitted to the user of the system or a documentation officer so as to decide whether the obtained indexing result should be recorded in the data file and to what extent it should possibly be recorded.

In a specific application, the method according to the invention will be used for indexing and/or retrieving documents from electronic mail, so that the user can retrieve a lot of information via electronic mail but automatically also obtains a very efficient selection, so that all the data obtained must not be gone through one after the other.

It should be noted that working with a thesaurus in a specific domain and the automatic generation of a list of terms which are not included in the thesaurus and which allow for an update as mentioned above, is also a new aspect which is part of the present invention, irrespective of the fact whether this method is either or not combined with a search strategy whereby relations, including causal relations, are found.

It is clear that the present invention also concerns systems which are equipped with the necessary electronic means and algorithms to realize the above-mentioned method.

The present invention is by no means restricted to the embodiments described as an example; on the contrary, such a method and the system used thereby can be made according to different variants while still remaining within the scope of the invention.

What is claimed is:

1. Method for retrieving documents via an electronic data file, wherein said method comprises at least a step wherein keys are used for the retrieval which find one or several relations between textual data of the documents, comprising the step of:

indexing said documents electronically as a function of the relations occurring in the textual data of the documents in order to retrieve the documents, said step of indexing said documents comprising the steps of:

filtering the textual data to obtain explicit index terms by eliminating expletives and by determining explicit index terms by means of unigrams, bigrams, trigrams, or combinations of unigrams, bigrams, and trigrams occurring in the text;

using a thesaurus to add implicit index terms to the explicit index terms, said implicit index terms being broader than the explicit index terms; and filtering the implicit index terms based on a frequency of occurrence of the explicit index terms, wherein, for the relations, use is made of those relations existing between the generated index terms, which relations are automatically searched for on the basis of a list of terms containing a relation indication, wherein use is made of postulated frames which are composed of catchwords and of voice components, including the terms containing a relation indication, and wherein the text of the documents is examined for said frames, and wherein use is made of said frames with catchwords defining at least three arguments, each one of said at least three arguments representing a cause, an effect and a situation or condition respectively.

2. Method according to claim 1, wherein said relations at least consist of 'causal' relations.

3. Method according to claim 1, wherein said relations at least consist of 'functional' relations.

4. Method according to claim 1, wherein the searching for the relations and the indexing is carried out on the basis of the complete texts of said documents.

5. Method according to claim 1, wherein the bigrams or trigrams are formed, after the expletives have been eliminated and on the basis of the retained unigrams, by determining what terms are adjacent to them.

6. Method according to claim 1, wherein at least one frequency filtering is involved.

7. Method according to claim 1, wherein a list is made of the terms which do not occur in the thesaurus in order to update the thesaurus.

8. Method according to claim 7, wherein use is made of means which allow for an interactive updating by the user.

9. Method according to claim 1, wherein use is made of a thesaurus and of query builders which exclusively provide access via catchwords included in the thesaurus.

10. Method according to claim 1, wherein the relation between the index terms and the voice components is determined by means of an automatic syntactic analysis, and wherein an indexing is carried out as a function thereof.

11. Method according to claim 10, wherein the result of the syntactic analysis is submitted to a user of the system so that said user can decide whether the obtained result should be recorded and to what extent it should be recorded.

12. Method according to claim 10, wherein the result of the syntactic analysis is submitted to a documentation officer, so that said officer can decide whether the obtained result should be recorded and to what extent it should be recorded.

13. Method according to claim 1, said method is used for indexing and/or retrieving documents from electronic mail.

14. System for realizing the method according to claim 1 said system comprising electronic means, including algorithms, by means of which the above-mentioned method can be carried out.

15. Method according to claim 1, wherein use is made of causal frames which are composed of catchwords and of voice components, including the terms containing a relation indication, and wherein the text of the documents is examined for said frames.

16. Method for retrieving documents via an electronic data file, wherein said method comprises at least a step wherein keys are used for the retrieval which find one or several relations between textual data of the documents, comprising the step of:

indexing said documents electronically as a function of the relations occurring in the textual data of the documents in order to retrieve the documents, said step of indexing said documents comprising the steps of:

filtering the textual data to obtain explicit index terms by eliminating expletives and by determining explicit index terms by means of unigrams, bigrams, trigrams, or combinations of unigrams, bigrams, and trigrams occurring in the text; and using a thesaurus to add implicit index terms to the explicit index terms, said implicit index terms being broader than the explicit index terms; and wherein said relations are causal relations between the textual data of the documents, wherein, for the relations, use is made of those relations existing between the generated index terms, which relations are automatically searched for on the basis of a list of terms containing a relation indication, wherein use is made of postulated frames which are composed of catchwords and of voice components, including the terms containing a relation indication, and wherein the text of the documents is examined for said frames, and wherein use is made of said frames with catchwords defining at least three arguments, each one of said at least three arguments representing a cause, an effect and a situation or condition, respectively.

* * * * *